(12) United States Patent
Covaci et al.

(10) Patent No.: US 12,309,168 B2
(45) Date of Patent: May 20, 2025

(54) ARITHMETIC ENHANCEMENT OF C-LIKE SMART CONTRACTS FOR VERIFIABLE COMPUTATION

(71) Applicant: nChain Licensing AG, Zug (CH)

(72) Inventors: Alexandra Covaci, Canterbury (GB); Simone Madeo, London (GB); Patrick Motylinski, London (GB); Stephane Vincent, Luxembourg (LU)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/130,373

(22) Filed: Apr. 3, 2023

(65) Prior Publication Data

US 2023/0318804 A1  Oct. 5, 2023

Related U.S. Application Data

(63) Continuation of application No. 16/762,475, filed as application No. PCT/IB2018/058437 on Oct. 29, 2018, now Pat. No. 11,635,950.

(30) Foreign Application Priority Data

Nov. 9, 2017 (GB) .................................... 1718505
Nov. 30, 2017 (GB) .................................... 1719998

(Continued)

(51) Int. Cl.
*H04L 9/32* (2006.01)
*G06F 8/41* (2018.01)
(Continued)

(52) U.S. Cl.
CPC ............ *H04L 63/12* (2013.01); *G06F 8/44* (2013.01); *G06F 8/447* (2013.01); *G06F 8/451* (2013.01);
(Continued)

(58) Field of Classification Search
None
See application file for complete search history.

(56) References Cited

U.S. PATENT DOCUMENTS

| 4,667,290 A | 5/1987 | Goss et al. |
| 5,297,150 A | 3/1994 | Clark |

(Continued)

FOREIGN PATENT DOCUMENTS

| CN | 104580240 A | 4/2015 |
| CN | 106506146 A | 3/2017 |

(Continued)

OTHER PUBLICATIONS

Paganini, Pierluigi What is a Digital Signature? Fundamental Principles, Security Affairs, May 2012, https://securityaffairs.com/5223/digital-id/what-is-a-digital-signature-fundamental-principles.html, 7 pages.

(Continued)

*Primary Examiner* — Geoffrey R St Leger
(74) *Attorney, Agent, or Firm* — Tarolli, Sundheim, Covell & Tummino LLP

(57) ABSTRACT

The invention provides systems and methods for converting high level source code into an arithmetic circuit which represents the functionality expressed in the source code. The invention comprises a translation/interpretation component for performing this conversion. In a preferred embodiment, the source code is a smart contract such as those used in relation to a blockchain platform. The invention could be used in relation to the Bitcoin network, for example. A method in accordance with an embodiment comprises the steps of: processing a portion of high level source code (e.g. a smart contract) to generate an arithmetic circuit. The arithmetic circuit comprises one or more arithmetic gates arranged to represent at least some of the functionality expressed in the source code. The processing involves (Continued)

evaluating one or more constants provided in the source code to produce one or more expressions that include Boolean and/or arithmetic operators. The arithmetic circuit comprises n-bit wires connected to arithmetic gates; it can be used to provide a hardware and/or software circuit. The arithmetic circuit can be used to generate a quadratic program which can be executed upon a processor.

15 Claims, 5 Drawing Sheets

(30) Foreign Application Priority Data

| Dec. 13, 2017 | (GB) | .................................... | 1720768 |
| Feb. 2, 2018 | (GB) | .................................... | 1801753 |
| Apr. 10, 2018 | (GB) | .................................... | 1805948 |
| Apr. 20, 2018 | (GB) | .................................... | 1806444 |

(51) Int. Cl.
*G06F 9/445* (2018.01)
*G06F 16/27* (2019.01)
*G06Q 20/06* (2012.01)
*G06Q 20/40* (2012.01)
*H04L 9/00* (2022.01)
*H04L 9/06* (2006.01)
*H04L 9/30* (2006.01)
*H04L 9/40* (2022.01)

(52) U.S. Cl.
CPC .......... *G06F 9/44521* (2013.01); *G06F 16/27* (2019.01); *G06Q 20/065* (2013.01); *G06Q 20/401* (2013.01); *G06Q 20/405* (2013.01); *H04L 9/0637* (2013.01); *H04L 9/0643* (2013.01); *H04L 9/30* (2013.01); *H04L 9/3218* (2013.01); *H04L 9/3236* (2013.01); *H04L 9/3239* (2013.01); *H04L 9/3247* (2013.01); *H04L 9/3263* (2013.01); *H04L 9/50* (2022.05); *H04L 9/0618* (2013.01); *H04L 9/3066* (2013.01); *H04L 2209/34* (2013.01); *H04L 2209/56* (2013.01)

(56) References Cited

U.S. PATENT DOCUMENTS

| 5,404,531 | A | 4/1995 | Wakatani |
| 5,499,191 | A | 3/1996 | Young |
| 5,920,830 | A | 7/1999 | Hatfield et al. |
| 6,064,928 | A | 5/2000 | Wilson et al. |
| 6,161,180 | A | 12/2000 | Matyas et al. |
| 6,519,754 | B1 | 2/2003 | McElvain et al. |
| 7,085,701 | B2 | 8/2006 | Rich et al. |
| 7,209,555 | B2 | 4/2007 | Futa et al. |
| 7,281,017 | B2 | 10/2007 | Hostetter et al. |
| 7,590,236 | B1 | 9/2009 | Boneh et al. |
| 8,165,287 | B2 | 4/2012 | Ghouti et al. |
| 8,189,771 | B2 | 5/2012 | Ghouti et al. |
| 8,331,556 | B2 | 12/2012 | Billet et al. |
| 8,607,129 | B2 | 12/2013 | Radhakrishnan et al. |
| 8,824,670 | B2 | 9/2014 | Icart et al. |
| 8,904,181 | B1 | 12/2014 | Felsher et al. |
| 9,026,978 | B1 | 5/2015 | Liu et al. |
| 9,286,602 | B2 | 3/2016 | Rosati et al. |
| 9,483,596 | B1 | 11/2016 | Badar et al. |
| 9,569,771 | B2 | 2/2017 | Lesavich et al. |
| 10,135,607 | B1 | 11/2018 | Roets |
| 10,339,523 | B2 | 7/2019 | McDonough et al. |
| 10,419,209 | B1 | 9/2019 | Griffin et al. |
| 10,515,567 | B2 | 12/2019 | Lablans |
| 11,226,799 | B1 | 1/2022 | Sundaresan et al. |
| 2003/0125917 | A1 | 7/2003 | Rich et al. |
| 2004/0015739 | A1 | 1/2004 | Heinkel et al. |
| 2005/0004899 | A1 | 1/2005 | Baldwin et al. |
| 2005/0139657 | A1 | 6/2005 | Hopkins |
| 2005/0262353 | A1 | 11/2005 | Gentry et al. |
| 2006/0149962 | A1 | 7/2006 | Fountain et al. |
| 2007/0061487 | A1 | 3/2007 | Moore et al. |
| 2007/0157132 | A1 | 7/2007 | Cheng et al. |
| 2008/0127067 | A1 | 5/2008 | Aubertine et al. |
| 2010/0067686 | A1 | 3/2010 | Minematsu |
| 2010/0131933 | A1 | 5/2010 | Kim et al. |
| 2010/0272209 | A1 | 10/2010 | Lee et al. |
| 2011/0024678 | A1 | 2/2011 | Schmitt |
| 2011/0200188 | A1 | 8/2011 | Ghouti et al. |
| 2012/0284175 | A1 | 11/2012 | Wilson et al. |
| 2013/0031446 | A1 | 1/2013 | Kamiya |
| 2013/0097420 | A1 | 4/2013 | Zaverucha |
| 2014/0250296 | A1 | 9/2014 | Hansen |
| 2014/0321644 | A1 | 10/2014 | Lemieux |
| 2014/0337234 | A1 | 11/2014 | Tang et al. |
| 2015/0363598 | A1 | 12/2015 | Xu et al. |
| 2015/0379510 | A1 | 12/2015 | Smith |
| 2016/0004820 | A1 | 1/2016 | Moore |
| 2016/0087802 | A1 | 3/2016 | Peeters |
| 2016/0140340 | A1 | 5/2016 | Walters et al. |
| 2016/0162897 | A1 | 6/2016 | Feeney |
| 2016/0204938 | A1 | 7/2016 | Kounavis et al. |
| 2016/0283941 | A1 | 9/2016 | Andrade |
| 2016/0357948 | A1 | 12/2016 | Takeuchi |
| 2017/0039330 | A1 | 2/2017 | Tanner, Jr. et al. |
| 2017/0048209 | A1 | 2/2017 | Lohe et al. |
| 2017/0085545 | A1 | 3/2017 | Lohe et al. |
| 2017/0091750 | A1 | 3/2017 | Maim |
| 2017/0091756 | A1 | 3/2017 | Stern et al. |
| 2017/0131983 | A1 | 5/2017 | Roytman et al. |
| 2017/0132421 | A1 | 5/2017 | Unitt |
| 2017/0132619 | A1 | 5/2017 | Miller et al. |
| 2017/0140408 | A1 | 5/2017 | Wuehler |
| 2017/0142103 | A1 | 5/2017 | Bringer et al. |
| 2017/0155515 | A1 | 6/2017 | Androulaki et al. |
| 2017/0177312 | A1 | 6/2017 | Boehm et al. |
| 2017/0178263 | A1 | 6/2017 | Kraemer et al. |
| 2017/0180341 | A1 | 6/2017 | Walker et al. |
| 2017/0220815 | A1 | 8/2017 | Ansari et al. |
| 2017/0221052 | A1 | 8/2017 | Sheng et al. |
| 2017/0249716 | A1 | 8/2017 | Meixner et al. |
| 2017/0250815 | A1 | 8/2017 | Cuende et al. |
| 2017/0277909 | A1 | 9/2017 | Kraemer et al. |
| 2017/0278100 | A1 | 9/2017 | Kraemer et al. |
| 2017/0279611 | A1 | 9/2017 | Kraemer et al. |
| 2017/0286079 | A1 | 10/2017 | Cho et al. |
| 2017/0286717 | A1 | 10/2017 | Khi et al. |
| 2017/0287090 | A1 | 10/2017 | Hunn et al. |
| 2017/0317833 | A1 | 11/2017 | Smith et al. |
| 2017/0317834 | A1 | 11/2017 | Smith et al. |
| 2017/0337319 | A1 | 11/2017 | Camus et al. |
| 2017/0338947 | A1 | 11/2017 | Ateniese et al. |
| 2017/0344988 | A1 | 11/2017 | Cusden et al. |
| 2017/0352209 | A1 | 12/2017 | Keuffer et al. |
| 2017/0353309 | A1 | 12/2017 | Gray |
| 2018/0034634 | A1 | 2/2018 | Benarroch Guenun et al. |
| 2018/0039667 | A1 | 2/2018 | Pierce et al. |
| 2018/0049043 | A1 | 2/2018 | Hoffberg |
| 2018/0075453 | A1 | 3/2018 | Durvasula et al. |
| 2018/0089758 | A1 | 3/2018 | Stradling et al. |
| 2018/0117446 | A1 | 5/2018 | Tran et al. |
| 2018/0167201 | A1 | 6/2018 | Naqvi |
| 2018/0204005 | A1 | 7/2018 | Gajek et al. |
| 2018/0270065 | A1 | 9/2018 | Brown et al. |
| 2018/0349631 | A1 | 12/2018 | Illendula et al. |
| 2019/0095631 | A1 | 3/2019 | Roets et al. |
| 2019/0138753 | A1 | 5/2019 | Wallrabenstein |
| 2019/0163887 | A1 | 5/2019 | Frederick et al. |
| 2019/0180276 | A1 | 6/2019 | Lee et al. |
| 2019/0182035 | A1* | 6/2019 | Chari ..................... H04L 9/083 |
| 2019/0295182 | A1 | 9/2019 | Kfir et al. |
| 2020/0050780 | A1 | 2/2020 | Uhr et al. |
| 2020/0184557 | A1 | 6/2020 | Wang |
| 2020/0327498 | A1 | 10/2020 | Weber et al. |

(56) References Cited

U.S. PATENT DOCUMENTS

| | | | |
|---|---|---|---|
| 2021/0019746 | A1 | 1/2021 | Adjaz et al. |
| 2021/0073795 | A1 | 3/2021 | Ruiz et al. |
| 2021/0342490 | A1 | 11/2021 | Briancon et al. |
| 2023/0269070 | A1 | 8/2023 | Covaci et al. |
| 2024/0143739 | A1 | 5/2024 | Cao et al. |

FOREIGN PATENT DOCUMENTS

| | | |
|---|---|---|
| CN | 106534317 A | 3/2017 |
| CN | 107040545 A | 8/2017 |
| CN | 107179932 A | 9/2017 |
| CN | 107274184 A | 10/2017 |
| CN | 107426234 A | 12/2017 |
| EP | 3249599 A1 | 11/2017 |
| JP | H08305547 A | 11/1996 |
| JP | 2006505055 A | 2/2006 |
| JP | 2009541853 A | 11/2009 |
| JP | 2011119952 A | 6/2011 |
| JP | 5697153 B2 | 4/2015 |
| JP | 2015132754 A | 7/2015 |
| JP | 2021502636 A | 1/2021 |
| JP | 7208989 B2 | 1/2023 |
| JP | 7221954 B2 | 2/2023 |
| JP | 7285840 B2 | 6/2023 |
| KR | 101795696 B1 | 11/2017 |
| KR | 20200096790 A | 8/2020 |
| WO | 2016131577 A1 | 8/2016 |
| WO | 2016155804 A1 | 10/2016 |
| WO | 2016206567 A1 | 12/2016 |
| WO | 2017008829 A1 | 1/2017 |
| WO | 2017032541 A1 | 3/2017 |
| WO | 2017079652 A1 | 5/2017 |
| WO | 2017104149 A1 | 6/2017 |
| WO | 2017145010 A1 | 8/2017 |
| WO | 2017148527 A1 | 9/2017 |
| WO | 2017178956 A1 | 10/2017 |
| WO | 2017187396 A1 | 11/2017 |
| WO | 2017187398 A1 | 11/2017 |
| WO | 2017187399 A1 | 11/2017 |
| WO | 2017190795 A1 | 11/2017 |
| WO | 2018127446 A1 | 7/2018 |
| WO | 2018127456 A2 | 7/2018 |

OTHER PUBLICATIONS

Justus, Benjamin, "Point Compression and Coordinate Recovery for Edwards Curves over Finite Field", Annals of West University of Timisoara-Mathematics and Computer Science, 2014, 15 pages.

Intellectual Property Office of Korea, "Request for the Submission of an Opinion" in Application No. 10-2020-7014213, Jan. 31, 2024, 7 pages.

Japan Patent Office "Notice of Reasons for Rejection" in Application No. 2023-014319, Feb. 13, 2024, 12 pages.

"How Log Proofs Work," Certificate Transparency, Sep. 25, 2017 [retrieved May 2, 2018], https://web.archive.org/web/20170925180136/http://www.certificate-transparency.org/log-proofs-work, 5 pages.

Anonymous, "Background Page," Oraclize, Oct. 2017 [retrieved May 2, 2018], https://web.archive.org/web/20171017121053/http://docs.oraclize.it/, 18 pages.

Bertani et al., "How can I trust smart contracts that use Oraclize?," Reddit, May 25, 2017 [retrieved May 2, 2018], https://www.reddit.com/r/ethereum/comments/6d7j7x/how_can_i_trust_smart_contracts_that_use_oraclize/di0nb17/, 5 pages.

Fu, "Off-Chain Computation Solutions for Ethereum Developers," Medium, Sep. 12, 2017 [retreived May 2, 2018], https://medium.com/@YondonFu/off-chain-computation-solutions-for-ethereum-developers-507b23355b17, 8 pages.

International Search Report and Written Opinion mailed Mar. 14, 2019, Patent Application No. PCT/IB2018/059920, 12 pages.

Spencertruman et al., "[Whitepaper] Witnet: A Decentralized Oracle Network Protocol," Bitcoin Forum, Dec. 11, 2017 [retrieved May 2, 2018], https://bitcointalk.org/index.php?topic=2567253.0, 9 pages.

Tarr, "Merkle Tree Logs #27," https://github.com/ssbc/secure-scuttlebutt/issues/27, Sep. 17, 2014, 4 pages.

Tarr, "Tree-Exchange," Github, Aug. 4, 2014 (last updated Sep. 17, 2014) [retrieved May 10, 2018], https://github.com/dominictarr/tree-exchange, 3 pages.

UK Commercial Search Report mailed May 4, 2018, Patent Application No. GB1720946.1, 8 pages.

UK IPO Search Report mailed Jun. 15, 2018, Patent Application No. GB1720946.1, 4 pages.

Van Den Hooff et al., "VerSum: Verifiable Computations over Large Public Logs, " Proceedings of the 2014 ACM SIGSAC Conference on Computer and Communications Security, Nov. 3, 2014, 14 pages.

Zhang et al., "A Remote-Attestation-Based Extended Hash Algorithm for Privacy Protection," 2017 International Conference on Computer Network, Electronic and Automation (ICCNEA), Sep. 23, 2017, 4 pages.

Klmoney, "Part 1: Transaction Basics", Jun. 6, 2017, retrieved from the internet, https://web.archive.org/web/20170606202729/https://klmoney.wordpress.com/bitcoin-dissecting-transactions-part-1, 9 pages.

Vangie, Beal, "What is a Computer System?" Webopedia, Aug. 1, 2022, https://www.webopedia.com/definitions/computer-system, 2 pages.

Bertani, "Scalable Onchain Verification for Authenticated Data Feeds and Offchain Computations," YouTube, Ethereum Foundation, Nov. 26, 2017 [retrieved May 10, 2018], https://www.youtube.com/watch?v=7uQdEBVu8Sk, 19:19, 4 pages.

Tarr et al., "Merkle Tree Logs #27," GitHub Secure-Scuttlebutt project page, Sep. 17, 2014 [retrieved May 10, 2018], https://github.com/ssbc/secure-scuttlebutt/issues/27, 4 pages.

Antonopoulos, "Mastering Bitcoin—Unlocking Digital Cryptocurrencies," O'Reilly Media, Inc., Dec. 20, 2014, 282 pages.

Ben-Sasson et al. "Scalable Zero Knowledge via Cycles of Elliptic Curves" [online] IACR, Sep. 18, 2016 [retrieved Feb. 10, 2022]. Retrieved from https://eprint.iacr.org/2014/595.pdf, 2016, 49 pages.

Ben-Sasson et al., "SNARKs for C: Verifying program executions succinctly and in zero knowledge, " Advances in Cryptology—CRYPTO 2013, Aug. 18, 2013, 19 pages.

Ben-Sasson et al., "Succinct Non-Interactive Zero Knowledge for a von Neumann Architecture," USENIX Security 2014, first disclosed Dec. 30, 2013, last revised May 19, 2015, https://eprint.iacr.org/2013/879.pdf, 37 pages.

Ben-Sasson et al., "Zerocash: Decentralized Anonymous Payments from Bitcoin," 2014 IEEE Symposium on Security and Privacy, May 18, 2014, http://zerocash-project.org/media/pdf/zerocash-oakland2014.pdf, 16 pages.

Bitcoinstrings, "Blockchain in Words," retrieved from https://bitcoinstrings.com/blk00281.txt, Dec. 2013, 667 pages.

Bowe, "Pay-to-Sudoku," GitHub, retrieved from https://github.com/zcash-hackworks/pay-to-sudoku/blob/master/README.md, 2016, 2 pages.

Buterin, "Quadratic Arithmetric Programs: from Zero to Hero," retrieved from https://medium.com/@VitalikButerin/quadratic-arithmetic-programs-from-zero-to-hero-f6d558cea649, Dec. 11, 2016, 9 pages.

Campanelli et al., "Zero-knowledge contingent payments revisited: Attacks and payments for services," Proceedings of the 2017 ACM SIGSAC Conference on Computer and Communications Security, Oct. 30, 2017, 28 pages.

Canetti et al., "Practical Delegation of Computation Using Multiple Servers," CCS, Oct. 17, 2011, 10 pages.

Castor, "Trust Your Oracle? Cornell Launches Tool for Confidential Blockchain Queries," CoinDesk, retrieved from https://www.coindesk.com/tech/2017/05/17/trust-your-oracle-cornell-launches-tool-for-confidential-blockchain-queries/, May 17, 2017, 5 pages.

Commercial Search Report mailed Feb. 28, 2018, United Kingdom Patent Application No. 1719998.5, filed Nov. 30, 2017, 6 pages.

Costello et al., "Geppetto: versatile Verifiable Computation," 2015 IEEE Symposium on Security and Privacy, 2015, 22 pages.

Covaci et al., "NECTAR: Non-Interactive Smart Contract Protocol using Blockchain Technology," arXiv preprint arXiv:1803.04860, Mar. 13, 2018, 8 pages.

(56) References Cited

OTHER PUBLICATIONS

Davidsen et al., "Empowering the Economy of Things," 2017, 54 pages.
Eberhardt et al., "ZoKrates—Scalable Privacy-Preserving Off-Chain Computations," Information Systems Engineering (ISE), Aug. 2018, 8 pages.
Ethereum Foundation, "ZoKrates—A Toolbox for zkSNARKS on Ethereum," https://www.youtube.com/watch?v=sSlrywb5J_0, Nov. 26, 2017, 12 pages.
Fee et al., "Cryptography using Chebyshev polynomials," Maple Summer Workshop, Burnaby, Canada, Jul. 11, 2004, http://www.cecm.sfu.ca/CAG/ppaers/CHEB, 16 pages.
Fiore et al., Hash First, Argue Later Adaptive Verifiable Computations on Outsourced Data, ACM Computer and Communications Security, 2016, 40 pages.
Fournet et al., "A Certified Compiler for Verifiable Computing," HAL Open Science, Jun. 2016, 14 pages.
Franz et al., "CBMC-GC: An ANSI C Compiler for Secure Two-Party Computations," retrieved from https://arise.or.at/pubpdf/CBMC-GC_An_ANSI_C_Compiler_for_Secure_Two-Party_Computations.pdf, 2014, 5 pages.
Fuchsbauer et al., "Proofs on Encrypted Values in Bilinear Groups and an Applicaiton to Anonymity of Signatures," Third International Conference on Pairing-based Cryptography, Aug. 2009, 26 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
Hearn, "Continuing the zkSNARK Tutorials," retrieved from https://blog.plan99.net/vntinyram-7b9d5b299097, Dec. 15, 2016, 9 pages.
Hong et al., "Verifiable Computation of Large Polynomials," retrieved from http://or.nsfc.gov.cn/bitstream/00001903-5/154735/1/1000009080185.pdf, Dec. 16, 2014, 13 pages.
International Search Report and Written Opinion mailed Jan. 15, 2019, Patent Application No. PCT/IB2018/058434, 11 pages.
International Search Report and Written Opinion mailed Jan. 17, 2019, Patent Application No. PCT/IB2018/058432, 11 pages.
International Search Report and Written Opinion mailed Jan. 17, 2019, Patent Application No. PCT/IB2018/058437, 10 pages.
International Search Report and Written Opinion mailed Jan. 22, 2019, Patent Application No. PCT/IB2018/058583, 10 pages.
International Search Report and Written Opinion mailed Jan. 23, 2019, Patent Application No. PCT/IB2018/058433, 12 pages.
International Search Report and Written Opinion mailed Jan. 23, 2019, Patent Application No. PCT/IB2018/058491, 12 pages.
Jehan, "Rockchain Decentralized Audited Data Networks," White Paper, retrieved from https://www.rockchain.org/RockchainWhitePaper.pdf, Jan. 20, 2018, 28 pages.
Kerber, "Verifiable Computation in Smart Contracts," University of Edinburgh School of Informatics Computer Science 4th Year Project Report, published online Apr. 4, 2017 [retrieved May 2, 2018], https://git.drwx.org/bsc/proj-report/raw/branch/master/report.pdf, 49 pages.
Keutzer et al., "Anatomy of a Hardware Compiler," 1988, 10 pages.
Kiayias et al., "Proofs of Proofs of Work with Sublinear Complexity," Financial Cryptography and Data Security, 2016, 18 pages.
Kosba et al., "Hawk: The Blockchain Model of Cryptography and Privacy-Preserving Smart Contracts," IEEE Symposium on Security and Privacy, May 22, 2016, 31 pages.
Kreuter, "Techniques for Scalable Secure Computation Systems," retrieved from https://repository.library.northeastern.edu/files/neu:cj82rh04k/fulltext.pdf, May 2018, 145 pages.
Król et al., "SPOC: Secure Payments for Outsourced Computations," Jul. 17, 2018, 6 pages.
Kumaresan et al., "How to Use Bitcoin to Incentivize Correct Computations," retrieved from https://people.csail.mit.edu/ranjit/papers/incentives.pdf, Nov. 2014, 12 pages.
Kuzminov et al., "Bridging the Gaps with Iolite Blockchain," Iolite Foundation White Paper, 2017, 13 pages.
Malkhi et al., "Fairplay—A Secure Two-Party Computation System," Aug. 2004, 17 pages.
Mathworks, "Matlab Coder—Generate C and C++ Code From MATLAB Code," 9 pages.
Maxwell et al., "Chat logs," Bitcoin-wizards IRC Chat Channel, Aug. 16, 2013 [retrieved May 2, 2018], https://download.wpsoftware.net/bitcoin/wizards/2013/08/13-08-16.log, 1 page.
Maxwell et al., "CoinCovenants using SCIP signatures, an amusingly bad idea," Bitcoin Forum, Aug. 20, 2013 [retrieved Apr. 13, 2018], https://bitcointalk.org/index.php?topic=278122.0, 5 pages.
Maxwell et al., "Really Really ultimate blockchain compression: CoinWitness," Bitcoin Forum, Aug. 19, 2013 [retrieved Apr. 11, 2018], https://bitcointalk.org/index.php?topic=277389.0, 7 pages.
Maxwell, "The First Successful Zero-Knowledge Contingent Payment," Bitcoin Core, retrieved from https://bitcoincore.org/en/2016/02/26/zero-knowledge-contingent-payments-announcement/, Feb. 26, 2016, 5 pages.
Mayer, "zk-SNARK explained: Basic Principles," retrieved from https://www.researchgate.net/publication/321124635_zk-SNARK_explained_Basic_Principles, Dec. 2016, 9 pages.
Nakamoto, "Bitcoin: A Peer-to-Peer Electronic Cash System," Bitcoin, Oct. 31, 2008, https://bitcoin.org/bitcoin.pdf, 9 pages.
Ning, "Automatically Convert MATLAB Code to C Code," https://www.mathworks.com/videos/automatically-converting-matlab-code-to-c-code-96483.html, Aug. 19, 2014, 8 pages.
Parno et al., "Pinocchio: Nearly Practical Verifiable Computation," IEEE Symposium on Security and Privacy, May 19-22, 2013, 16 pages.
Parno et al., "Pinocchio: Nearly Practical Verifiable Computation," IEEE Symposium on Security and Privacy, May 19, 2013, 16 pages.
Parno, "A Note on the Unsoundness of vnTinyRAM's SNARK," retrieved from https://eprint.iacr.org/2015/437, May 6, 2015, 4 pages.
Prasad et al., "Effect pf Quine-Mccluskey Simplification on Boolean Space Complexity," IEEE Xplore, Jul. 25-26, 2009, 6 pages.
Satoshi et al., "Connection Limits," Bitcoin Forum, Aug. 9, 2010, https://bitcointalk.org/index.php?topic=741.0;prev_next=prev, 2 pages.
Schaeffer et al., "ZoKrates—a Toolbox for zkSNARKS on Ethereum," https://github.com/Zokrates/ZoKrates, Feb. 4, 2019, 3 pages.
Stuart, "EECS Presents Awards for Outstanding PhD and SM Theses," EECS, Nov. 8, 2017, 2 pages.
Sward et al. "Data Insertion in Bitcoin's Blockchain" [online] Augustana College, Jul. 2017 [retrieved Feb. 10, 2022]. Retrieved from the Internet: URL: https://digitalcommons.augustana.edu/cgi/viewcontent.cgi?article=1000&context=cscfaculty 2017, 19 pages.
Teutsch et al., "A scalable verification solution for blockchains," Nov. 16, 2017, https://people.cs.uchicago.edu/~teutsch/papers/truebit.pdf, 50 pages.
Todd, "[bitcoin-dev] Building Blocks of the State Machine Approach to Consensus," petertodd.org, Jun. 20, 2016, https://lists.linuxfoundation.org/pipermail/bitcoin-dev/2016-June/012773.html, six pages.
Turner, "CSE 260. Introduction to Digital Logic and Computer Design," Syllabus and Text Book, https://www.arl.wustl.edu/-jst/cse/260/ddc.pdf, 2015, 435 pages.
UK Commercial Search Report mailed Dec. 3, 2018, Patent Application No. GB1806444.4, 8 pages.
UK Commercial Search Report mailed Feb. 2, 2018, Patent Application No. GB1718505.9, 7 pages.
UK Commercial Search Report mailed May 31, 2018, Patent Application No. GB1801753.3, 8 pages.
UK Commercial Search Report mailed Oct. 25, 2018, Patent Application No. GB1805948.5, 9 pages.
UK IPO Search Report mailed Jul. 26, 2018, Patent Application No. GB1801753.3, 5 pages.
UK IPO Search Report mailed Nov. 2, 2018, Patent Application No. GB1805948.5, 4 pages.
UK IPO Search Report mailed Nov. 8, 2018, Patent Application No. GB1806444.4, 6 pages.
United Kingdom Commercial Search Report mailed Apr. 20, 2018, Patent Application No. 1720768.9, filed Dec. 13, 2017, 8 pages.
United Kingdom Intellectual Property Office Search Report mailed Jun. 12, 2018, Patent Application No. 1720768.9, filed Dec. 13, 2017, 7 pages.

(56) References Cited

OTHER PUBLICATIONS

United Kingdom Intellectual Property Office Search Report mailed May 3, 2018, Patent Application No. 1719998.5, filed Nov. 30, 2017, 6 pages.
United Kingdom IPO Search Report mailed Apr. 27, 2018, Patent Application No. 1718505.9, filed Nov. 9, 2017, 5 pages.
Viacoin Dev Team, "Styx: Unlinkable Anonymous Atomic Payment Hub For Viacoin," viacoin.org, Oct. 14, 2016, http://docplayer.net/35213119-Styx-unlinkable-anonymous-atomic-payment-hub-for-viacoin-viacoin-dev-team-viacoin-org.html, 18 pages.
Virza, "On Deploying Succinct Zero-Knowledge Proofs" [online] MIT, Sep. 2017 [retrieved Feb. 10, 2022]. Retrieved from the Internet: URL: On Deploying Succinct Zero-Knowledge Proofs, 2016, 131 pages.
Wikipedia, "Precompiled Header," Retrieved Mar. 30, 2022, https://en.wikipedia.org/w/index.php?title=Precompiled_header&oldid=807155683, 3 pages.
Wikipedia, "Zero Knowledge Contingent Payment," Bitcoin Wiki, retrieved from https://en.bitcoin.it/wiki/Zero_Knowledge_Contingent_Payment, Apr. 8, 2020, 3 pages.
Wu et al., "Libsnark: a C++ Library for zkSNARK Proofs," SCIPR Lab, libsnark/README.md at 92a80f74727091fdc40e6021dc42e9f6b67d5176, Aug. 18, 2017, 9 pages.
ZCash, "zk-SNARKs," zCash website, retreived Apr. 1, 2022 from https://web.archive.org/web/20171107012237/https://z.cash/technology/zksnarks.html, Nov. 24, 2017, 1 page.
Brown et al., "Transport layer security (tls) evidence extensions," Working Draft, IETF Secretariat, Internet-Draft drafthousley-evidence-extns-01, https://tools.ietf.org/pdf/draft-housley-evidence-extns-01, Nov. 2006 [retrieved May 2, 2018], 21 pages.
Covaci et al., "Computer-implemented system and method," United Kingdom Patent Application No. 1720946.1, filed Dec. 15, 2017.
Gennaro et al., "Quadratic Span Programs and Succint NIZKs without PCPs," Annual International Conference on the Theory and Applications of Cryptographic Techniques, May 26, 2013, 20 pages.
Gennaro et al., "Robust Threshold DSS Signatures," International Conference on the Theory and Applications of Cryptographic Techniques, May 12, 1996, https://link.springer.com/content/pdf/10.1007%2F3-540-68339-9_31.pdf, 18 pages.
Hajjeh et al., "TLS Sign," TLS Working Group, Internet Draft Version 4, Dec. 15, 2007 [retrieved May 2, 2018], https://tools.ietf.org/html/draft-hajjeh-tls-sign-04, 12 pages.
International Search Report and Written Opinion mailed Mar. 14, 2019, Patent Application No. PCT/IB2018/059770, 12 pages.
International Search Report and Written Opinion mailed Mar. 19, 2019, Patent Application No. PCT/IB2018/059918, 14 pages.
Mayer, "zk-SNARK Explained: Basic Principles," Dec. 13, 2016, 9 pages.
Müller, "A Short Note on Secret Sharing Using Elliptic Curves," Proceedings of SECRYPT 2008, Jul. 26, 2008, http://www.scitepress.org/Papers/2008/19183/19183.pdf, 4 pages.
Ritzdorf et al., "TLS-N: Non-repudiation over TLS Enabling Ubiquitous Content Signing for Disintermediation," IACR ePrint report, first disclosed 2017 [retrieved May 2, 2018], 16 pages.
Schoenmakers et al., "Trinocchio: Privacy-Preserving Outsourcing by Distributed Verifiable Computation," International Conference on Applied Cryptography and Network Security, Jun. 19, 2016, https://eprint.iacr.org/2015/480.pdf, 33 pages.
Tillich et al., "Circuits of basic functions suitable for MPC and FHE," https://homes.esat.kuleuven.be/~nsmart/MPC/, first disclosed 2012, retrieved May 2, 2018, 2 pages.
Turner, "Designing Digital Circuits a modern approach," CSE 260, Introduction to Digital Logic and Computer Design, Spring 2014, 435 pages.
Wikipedia, "Huffman coding," Wikipedia the Free Encyclopedia, Feb. 24, 2018, https://en.wikipedia.org/w/index.php?title=Huffman_coding&oldid=827366029, 11 pages.
Bitcoin Core, "The First Successful Zero-Knowledge Contingent Payment", 2022, 5 pages.
Zyskind et al., "Enigma: Decentralized Computation Platform with Guaranteed Privacy," arXiv preprint arXiv:1506, Jun. 10, 2015, 14 pages.
Chen et al., "Algebraic Geometric Secret Sharing Schemes and Secure Multi-Party Computations over Small Fields", Advances in Cryptology, 2006, 16 pages.
Al-Riyami, Sattam, S., "Cryptographic Schemes Based on Elliptic Curve Pairings", Technical Report, RHUL-MA-2002-2, Feb. 2, 2005, 278 pages.
Menezes et al., "Handbook of Applied Cryptography: pp. 33, 38," CRC Press, Oct. 16, 1996, 3 p.
Sanchez, David Cerezo, "Raziel: Private and Verifiable Smart Contracts in Blockchains", Sep. 17, 2017, 55 pages.
Seijas et al., "Scripting Smart Contract for Distributed Ledger Technology", Feb. 10, 2017, 33 pages.
CN Office Action for corresponding CN Patent Application No. 201880072692.7, issued Jul. 18, 2024, 7 pages.
Intellectual Property Office of Korea, "Request for the Submission of an Opinion," in Application No. 10-2024-7024191, Aug. 5, 2024, 4 pages.
Shocker, Ali, "Sustainable Blockchain through Proof of exercise," 2017 IEEE 16th International Symposium on Network Computing and Applications (NCA), Nov. 1, 2017, 9 pages.
Ball, M. et al., "Proof of Useful Work," Cryptology ePrint Archive, Report, Feb. 27, 2017, 31 pages.

* cited by examiner

ARITHMETIC ENHANCEMENT OF C-LIKE SMART CONTRACTS FOR VERIFIABLE COMPUTATION

CROSS REFERENCE TO RELATED APPLICATIONS

This application is a continuation of U.S. patent application Ser. No. 16/762,475, filed May 7, 2020, entitled "ARITHMETIC ENHANCEMENT OF C-LIKE SMART CONTRACTS FOR VERIFIABLE COMPUTATION," which is a 371 National Stage of International Patent Application No. PCT/IB2018/058437, filed Oct. 29, 2018, which claims priority to United Kingdom Patent Application No. 1805948.5, filed Apr. 10, 2018, United Kingdom Patent Application No. 1720768.9, filed Dec. 13, 2017, United Kingdom Patent Application No. 1718505.9, filed Nov. 9, 2017, United Kingdom Patent Application No. 1719998.5, filed Nov. 30, 2017, United Kingdom Patent Application No. 1806444.4, filed Apr. 20, 2018, and United Kingdom Patent Application No. 1801753.3, filed Feb. 2, 2018, the disclosures of which are incorporated herein by reference in their entirety.

This invention relates generally to the field of tools, techniques and systems for converting high level source code into another form e.g. interpreters. It also relates to blockchain technologies and, in particular, it relates to tools for building blockchain-implemented solutions. It also relates to the improved generation of machine-executable technologies such as, for example, smart contracts that are arranged to execute on a blockchain.

BACKGROUND OF INVENTION

In this document, the term "blockchain" refers to any of several types of electronic, computer-based, distributed ledgers. These include consensus-based blockchain and transaction-chain technologies, permissioned and unpermissioned ledgers, shared ledgers and variations thereof. It also includes private and public blockchains.

The most widely known application of blockchain technology is the Bitcoin ledger, although other blockchain implementations have been proposed and developed. While the example of Bitcoin may be referred to in the present disclosure, for the purpose of convenience and illustration, it should be noted that the invention is not limited to use with any particular implementation or variant of the Bitcoin blockchain or associated protocol, and alternative blockchain implementations and protocols fall within the scope of the present invention.

A blockchain is a peer-to-peer, electronic ledger which is implemented as a computer-based decentralised system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception.

The scripting language of the Bitcoin blockchain, known as Script, is stack based. Items can be pushed onto and popped off the top of the stack. For example, an OP EQUAL operation pops the top two items from the stack, compares them, and pushes a result (e.g., 1 if equal or 0 if unequal) to the top of the stack. In some scripting languages employed by some of the present embodiments, there may be at least two stacks: a main stack and an alternate stack.

In order for a transaction to be written to the blockchain, it must be "validated". Network nodes (miners) perform work to ensure that each transaction is valid, with invalid transactions rejected from the network. A node can have standards for validity different from other nodes.

Because validity in the blockchain is consensus based, a transaction is considered valid if a majority of nodes agree that a transaction is valid. Software clients installed on the nodes perform this validation work on transactions referencing an unspent transaction (UTXO) in part by executing the UTXO locking and unlocking scripts. If execution of the locking and unlocking scripts evaluates to TRUE and other validation conditions, if applicable, are met, the transaction is validated by the node. The validated transaction is propagated to other network nodes, whereupon a miner node can select to include the transaction in a blockchain.

Thus, in order for a transaction to be written to the blockchain, it must be i) validated by the first node that receives the transaction—if the transaction is validated, the node relays it to the other nodes in the network; and ii) it is added to a new block built by a miner; and iii) mined, i.e., added to the public ledger of past transactions. The transaction is considered to be confirmed when a sufficient number of blocks is added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the blockchain to implement new systems. It would be highly advantageous if the blockchain could be used for automated tasks and processes that are not limited to the realm of cryptocurrency. Such solutions would be able to harness the benefits of the blockchain (e.g., a permanent, tamper proof records of events, distributed processing etc.) while being more versatile in their applications.

One area of current research is the use of the blockchain for the implementation of "smart contracts". These are computer programs designed to automate the execution of the terms of a machine-readable contract or agreement. Unlike a traditional contract, which would be written in natural language, a smart contract is a machine executable program that comprises rules that can process inputs in order to produce results, which can then cause actions to be performed dependent upon those results.

In embodiments, a smart contract is "smart" in the sense that the creator, or some other specific entity, is not required for enforcement and/or execution of the smart contract. Human interaction is not required for execution or enforcement. That is, although interaction with specific entities can be encoded at specific steps in the smart contract, the smart contract can otherwise be automatically executed and self-enforced. It is machine readable and executable. In some examples, automatic execution refers to any entity being able to spend the UTXO and having an incentive (e.g., reward) to do so. Note that in such examples, the "any entity" that is able to spend the UTXO refers to an entity that is able to create the unlocking script without being required to prove knowledge of some secret. In other words, the spending transaction can be validated without verifying that the source of the data has access to a cryptographic secret (e.g., private asymmetric key, symmetric key, etc.). In addition, in such examples, self-enforcement refers to the validation nodes of the blockchain network being caused to enforce the spending transaction according to the constraints. In some examples, "spending" a UTXO refers to creating a spending transaction that references the UTXO and executes as valid.

Thus, there is a great deal of interest surrounding the uses to which blockchain technology can be put, beyond being simply a vehicle for cryptocurrency payments. This includes control of IoT devices, intelligent systems incorporating A.I. techniques and more.

However, while there are many people skilled in the art of programming using high level languages such as C, C++, Java etc, those capable of creating applications for the blockchain are comparatively few in numbers. This is partly because of the current need to code for the blockchain at relatively low level, using op_codes which manipulate the main and alt stacks. In particular, programming of smart contracts for implementation of a blockchain is known to be difficult and error prone—as explored in Delmolino, K., et al. (2015). *Step by Step Towards Creating a Safe Smart Contract: Lessons and Insights from a Cryptocurrency Lab*, and Juels, A., et al. (2013). *The Ring of Gyges: Using Smart Contracts for Crime*.

By enabling the creation of solutions and applications which can be used in conjunction with a blockchain, an improved blockchain and associated platform is provided. A solution for the calculation of arithmetic gates is also provided. The arithmetic circuit may be arranged for execution as or of a predicate. The invention enables the creation and encoding of an executable program (as opposed to merely providing a verification or proof as per prior art disclosures).

SUMMARY OF INVENTION

Thus, it is desirable to provide methods and systems that improve blockchain and distributed computing technology in one or more aspects. Such an improved solution has now been devised. Thus, in accordance with the present invention there are provided methods and systems as defined in the appended claims.

The invention may include systems and methods arranged to provide and facilitate programmability in a decentralized system. It may, for example, be a cryptocurrency system, a blockchain-implemented system and/or a distributed computation system. From one perspective, it reduces errors, time, effort, cost and resources required during the programming process. Thus, it provides a technical solution to a technical problem. From another perspective, it provides an enhanced blockchain solution because of the reduction in errors and bugs. It also preserves software integrity.

Advantageously, unlike known interpreters and compilers, the invention provides an architecture-independent solution. Moreover, it does not require the use of a virtual machine (VM) to enable execution.

The invention may provide computer-implemented systems and methods which take source code as input and produce an arithmetic circuit $\mathcal{C}$. The resulting circuit C may be a representation of the functionality of the HLL source code (as opposed to a proof for verification). When executed, the arithmetic circuit C may provide a result of a computation which may then be verified. The circuit C may be machine executable or processed for execution on a machine. The source code may express or represent a computation.

This circuit may consist of "wires" that carry values from a field $\mathbb{F}$ and connect to addition and multiplication gates. The arithmetic circuit could be embodied in software, and/or a physical circuit having wires and logic gates. The source code may comprise or represent some or all of the functionality or computation $\mathcal{P}$ written in a HLL or GPL. The invention may be described as an interpreter for converting that computation into an arithmetic circuit $\mathcal{C}$. The arithmetic circuit $\mathcal{C}$ and some input x may be supplied to an entity for execution.

The invention may convert or translate a computation, expressed in source code, into a predicate that can be executed (by a machine/processor). The (HLL/GPL) source code may be pre-compiled or pre-processed.

In one or more embodiments, a public evaluation key EK and a public verification key VK may be derived using a secret value s. The method may comprise the step of using EK and VK to evaluate the computation on a particular input x. An output y, the values of one or more circuit wires and EK may be used to produce a proof-of-correctness π. The proof π may be stored on a blockchain. It may be stored in a blockchain transaction. The method may comprise the step of providing the proof in a blockchain transaction. It may comprise the step of submitting the transaction to the blockchain and/or storing it on the blockchain.

The method may comprise the step of verifying the proof stored on the blockchain. It may be verified by one or more parties. Advantageously, it may be verified by multiple parties without requiring a prover to separately interact with each of the parties. This provides a more efficient and quicker solution compared to the prior art.

All or some of the nodes in a blockchain network (eg bitcoin) may verify the transaction.

The verification may be performed using the public verification key VK and the proof π in order to verify a smart contract.

An advantage of the present invention is that miners verify transactions in accordance with the known, conventional blockchain protocols. The verification process is part of the miners' role within the network. Therefore, the invention is able to use efforts made by the nodes to technical advantage, as the verification is performed as part of required, existing operations. This provides an efficient arrangement compared to the prior art.

In some embodiments, the invention may form part of a workflow from a smart contract encoded in a DSL to a quadratic arithmetic program (QAP), as shown in FIG. 1.

As shown in FIG. 2, a Domain Specific Language (DSL) smart contract may be converted into a High Level Language contract. The DSL smart contract may be written in a formal language having precise semantics. The DSL smart contract may include a set of conditions. The outcome of the DSL smart contract may depend on fulfilment of the set of conditions.

A HLL precompiler (which may also be referred to as a pre-processor) may incorporate external libraries referenced by the HLL contract to produce a HLL pre-processed contract. The HLL precompiler may be referred to as a C pre-compiler in FIG. 2. The HLL contract may be referred to as a C-language contract in FIG. 2.

The HLL pre-processed contract (i.e. the source code) may then be transformed into an arithmetic circuit in accordance with an embodiment of the present invention. This arithmetic circuit may be optimised to produce a reduced arithmetic circuit from which QAP polynomials are derived.

The pre-processing conversion may be performed by a software program (program called the C pre-compiler in FIG. 2) that, as a result of execution, receives a set of conditions, such as the DSL smart contract, written in a DSL and translates the DSL code into HLL source code, such as the HLL contract. This may be referred to in FIG. 2 as the "C-language preprocessed contract". It may also be referred to herein as simply "the source code". The HLL contract may be a HLL program, such as a C++ program, that contains the contract defined in the DSL smart contract. The HLL precompiler may be a computer-executable program that processes the HLL contract and the required external libraries to produce the stand-alone HLL pre-processed contract (i.e. the source code).

The external libraries may be collections of pre-written subroutines, functions, classes, containers, values, and/or variable types utilised by the HLL contract by invocation. For example, by invoking the external libraries, the HLL contract gains the functionality of that library without having to implement the functionality itself. The HLL pre-processed contract may include a set of expressions and operators. The operators may include arithmetic operators (e.g., addition (+), multiplication (*), etc.), comparison operators (e.g., less than (<), equality (==), greater than or equal to (>=) etc.), conditional statements (e.g., if-then (?, :)), or logic operators (e.g., AND (&&), OR (||), NOT (!), XOR (⊕), etc.). In some embodiments, the main function (point of entry) has a predefined name and format.

The arithmetic circuit may be a directed acyclic graph DAG over a set of variables. Every node of the DAG with an indegree of zero may be an input gate representing a variable (e.g., $x_i$), and every other node of the DAG maybe a sum gate (+) or a product gate (×). Every gate (node) may have an outdegree of one, so the underlying graph may be a directed tree. The arithmetic circuit may have two measures of complexity: size and depth. In some examples, a "size" of an arithmetic circuit may be based on a number of gates within the arithmetic circuit. In some examples, "depth" of the arithmetic circuit may be based on the length of the longest directed path within the arithmetic circuit.

After the arithmetic circuit is generated, it may be reduced.

A computer-implemented method in accordance with the present invention may comprise the step of processing a portion of source code to generate an (executable) arithmetic circuit. The source code may be written in a high level programming language; and the arithmetic circuit may comprise one or more arithmetic gates arranged to represent some functionality or computation expressed in the source code.

This is in contrast to compilers and interprets known in the prior art, which do not convert HLL source code into an arithmetic circuit.

The arithmetic circuit may be executed on a processor. The circuit may be provided in a blockchain transaction.

This contrasts with prior art disclosures which teach the verification of a computation or logic circuit, and/or lead to the output of a (zero knowledge) proof. For example, the Pinocchio system generates a zero-knowledge proof for verifying general computations—"Communications of the ACM"; Vol. 59, No 2; 2016 Parno B, et al; "Pinocchio: Nearly Practical Verifiable Computations"; 103-112 (Parno). Thus, which prior art verification systems such as Pinocchio can be used in conjunction with the present invention for purposes of verification, the invention provides functionality and results which extend beyond the prior art.

Thus, the invention provides a machine executable output which represents and/or provides a computation. This may then be verified. This is in contrast with, for example, the Pinocchio system which compiles a verification script in order to validate a (separate) program that is arranged to perform the computation, thus comprising a two-part process. Instead, the present invention uses a one-part approach i.e. compiling the high level computation itself into an arithmetic circuit. Thus, the invention solves a different technical problem, using a very different approach, from such prior art.

Preferably, the source code is a smart contract. The source code may be pre-processed as described above.

Preferably, the processing step comprises the sub-step of evaluating one or more constants provided in the source code. This may provide one or more expressions comprising Boolean and/or arithmetic operators.

The method may further comprise the step of: using the arithmetic circuit to provide a hardware and/or software circuit. The arithmetic circuit may comprise n-bit wires connected to arithmetic gates. The arithmetic circuit is architecture independent. That is to say, it is not arranged for operation or use with a particular hardware or software architecture or platform. It does not require the use of a Virtual Machine. This is in contrast to prior art compilers and interpreters which are either architecture specific or require the use of a VM.

The method may further comprise the step of: pre-processing the source code to determine one or more constants. The pre-processing may comprise one or more of the following steps:
  removing comments; importing header declarations from header files to the source files;
  merging multiple source files;
  solving or evaluating directive and macros.

The method may further comprise the step of detecting all global variables declared in the source code, wherein a global variable relates to a function, a structure or class, a constant and/or an entry point for execution.

The method may further comprise the step of: generating a table of symbols (identifiers) to associate each symbol (i.e. identifier) provided in the source code with declaration information provided in the source code. The symbols in the table may be global and or local symbols.

The method may further comprise the step of: performing a line-by-line evaluation of the source code which results in an arithmetic and/or logic expression which expresses one or more out variables as a combination of logic and/or arithmetic operations applied on one or more input variables.

This may further comprise the step of: decoding of types; decoding of expressions; evaluation of expressions; and/or allocation of memory for data structures required by said functionality.

The method may further comprise the step of: mapping the arithmetic and/or logic operations of the expression to arithmetic gates. The mapping step may comprise the sub-step of: performing a wire expansion; and/or performing a wire compression.

The method may further comprise the step of: using the arithmetic circuit to generate a quadratic program comprising a set of polynomials which provide a description of the circuit. This method may further comprising the step of providing the quadratic program to an entity for execution of the quadratic program using one or more inputs.

The invention may also provide a system arranged to implement or execute any of the method steps described above. The system may comprise a translation or conversion component (i.e. an interpreter/compiler) arranged to perform the processing of the source code. Although compilers for the generation of (zero knowledge) proofs are known in the art (e.g. see "Pinocchio: Nearly Practical Verifiable Computations" (Parno) as referenced above) these do not compile into arithmetic circuit as per the present invention. The invention generates an answer rather than a proof or verification of the answer.

A computer-implemented system comprising:
a processor; and
memory including executable instructions that, as a result of execution by the processor, causes the system to perform any embodiment of the computer-implemented method one or more embodiments of the invention/method as described or claimed herein.

The instructions may comprise instructions for providing a translation or conversion component (i.e. an interpreter/compiler) arranged to perform the processing of the source code.

A non-transitory computer-readable storage medium having stored thereon executable instructions that, as a result of being executed by a processor of a computer system, cause the computer system to at least perform one or more embodiments of the invention/method as described or claimed herein.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Overview

Figure 1:
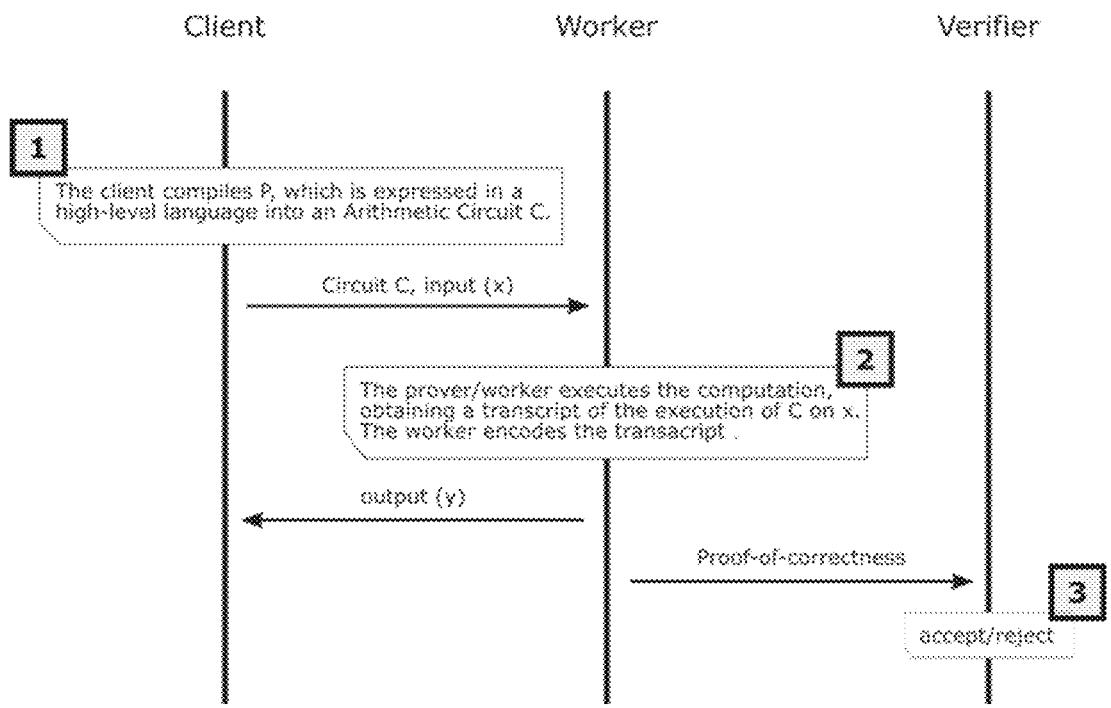
FIG. 1 illustrates a protocol of the verifiable computation and actors involved in an illustrative use and embodiment of the invention. These actors are the: Client, Worker (also known as the "prover") and Verifier.

We now provide an illustration of how the invention may be put into working practice according to one embodiment. In this example, we describe a possible implementation of an interpreter arranged to convert a high-level language contract (e.g. C/C++ language) to a circuit comprising arithmetic gates. However, the invention may be arranged to translate other HLL languages. Specific structures or building blocks can be used to facilitate this conversion. In one or more embodiments, this representation can be seen as the first step for the construction of a comprehensive pipeline able to provide a distributed verifiable computation.

The building blocks presented in this example are not intended to be an exhaustive list of all possible high-level language constructs handled by an embodiment of the invention. Moreover, alternate implementations of the presented examples can be provided. These fall within the scope of the person skilled in the art.

We now provide an illustrative embodiment of the invention. It is important to note, however, that this is an example of an application to which the invention may be put to use. The skilled person will understand that the invention can be put to advantageous use in other contexts and applications. The invention is not limited to use in relation to smart contracts or financial instruments.

Illustrative Embodiment of the Invention &
Example Use Case

For our example, consider a protocol which allows users to generate contracts for financial instruments using a Domain Specific Language (DSL). Once the contract has been generated, its execution can be outsourced to untrusted parties (called "workers" or "provers"), while its correctness can be publicly verified. The protocol makes use of cryptographic primitives that ensure:

Completeness, i.e. the honest verifier will be convinced of the validity of the output if the protocol is correctly followed;

Soundness, i.e. no cheating prover can convince the honest verifier about the authenticity of the output;

Zero-knowledge, i.e. no cheating verifier learns anything other than the validity of the output.

The principal benefits of the protocol are:

Man-in-the-middle attacks are prevented since no communication between the participants is requested.

It makes hard for malicious nodes to tamper with the data due to the use of the blockchain technologies.

Trusted third parties such as trusted hardware devices are avoided

Contract validations do not imply code re-execution. Computations are not replicated by every node in the network. Instead, proofs of honest execution are stored in the public blockchain and used for validation purposes only.

Such a system would be capable of handling various types of smart contracts, corresponding to various types of tasks and products, and not limited to financial applications or uses. Due to its decentralized and distributed nature, the (Bitcoin) blockchain provides a well-suited environment for settling agreements between two or more parties.

Such a system needs to provide and facilitate programmability in a decentralized cryptocurrency system. However, it is recognised in the art that smart contract programming is an error-prone process. See Delmolino, K., et al. (2015). *Step by Step Towards Creating a Safe Smart Contract: Lessons and Insights from a Cryptocurrency Lab*, and Juels, A., et al. (2013). *The Ring of Gyges: Using Smart Contracts for Crime*.

Therefore, it would be advantageous to be able to use DSLs that make smart contracts easier to write and to read by programmers, thus reducing error, reducing time, effort, cost and resources during the programming process. Ideally, non-specialist programmers would be able to write contracts without having to implement any cryptography. Instead, a compiler/interpreter would automatically compile the source code to a cryptographic protocol between the users and the blockchain. These are among the technical problems solved by the present invention. Such advantages are not provided by prior art techniques for verification and generation of proofs.

The framework uses state-of-the-art cryptographically verifiable computations (see Gennaro, R., et al. (2013). *Quadratic Span Programs and Succint NIZKs without PCPs*) and ensures correct function evaluation: an adversary obtaining sensitive information will be unable to manipulate the results thanks to the use of verifiable computations. This model makes use of blockchain technologies to store proof-of-correctness and it combines the "correct-by-construction" cryptography approach with smart contracts.

In this example, we focus on an implementation of a translation component able to convert a high-level language contract (e.g. C/C++ language) to a circuit comprising arithmetic gates. The resulting circuit is a machine executable representation of the HLL source code (as opposed to a proof for verification purposes). Specific structures or building blocks are used to facilitate this conversion. In our example, the invention can be used to provide the first step in the construction of a pipeline which is arranged to implement a distributed verifiable computation system. Note, however, that we again point out that the invention is not limited to this use case and can be used to effect in a wider range of applications and contexts.

In order to describe an illustrative implementation, we provide an overview of a framework for verifiable computations, followed by an introduction to circuit representations of smart contracts in accordance with the present invention.

Illustrative Use: Verifiable Computation: Framework

Problem statement. A client sends the specification of a computation P and input x to an untrusted prover (worker). The worker computes an output y and returns it to the client. If y P(x), then a correct prover should be able to produce a certificate of correctness and convince anyone (not just the client) of y's correctness. Otherwise, the verifier should reject y with high probability.

The protocol should be cheaper for the verifier than executing P(x) locally, or the protocol should handle computations P that the verifier could not execute itself. Moreover, no assumptions about the correctness of the worker's behaviour is needed.

Data Access. There are two distinct decentralized databases living in the system (i) DHT—off-chain data are stored on the DHT. Data are sufficiently randomized across the nodes and replicated to ensure high availability—and (ii) Public ledger—proofs of correct execution are stored on the blockchain and can be audited.

Protocol. The steps required by the protocol are depicted in FIG. 1. A computation P is represented by a circuit C. The client supplies the input x, and the worker executes the circuit C on the input x and claims the output is y. The prover is expected to obtain a valid transcript for {C, x, y}. A valid transcript for {C,x,y} is an assignment of values to the circuit wires such that:

the values assigned to the input wires are those of x;
the intermediate values correspond to the correct operation of each gate in C;
the values assigned to the output wires is y.

If the claimed output is incorrect, i.e. y≠$\mathcal{P}$(x), then a valid transcript for {$\mathcal{C}$, x, y} does not exist.

The setup phase involves writing contracts in a formal language with a precise semantics. In accordance with the present invention, the interpreter takes as input the source code and produces an arithmetic circuit C which consists of wires that carry values from a field F and connect to addition and multiplication gates. In some embodiments, arithmetic circuit optimisation techniques such as those described in U.K. Pat. Application No. 1718505.9 may be utilized in order to reduce the required resources necessary during determination of an outcome of the smart contract.

From the circuit C, the system generates a quadratic program Q, i.e. Q contains a set of polynomials that provides a complete description of the original circuit C. Then, the public parameters to be used by all provers and verifiers are generated.

A public evaluation key EK and the public verification key VK are derived using a secret value s selected by the client. The worker uses these public information to evaluate the computation on a particular input x. The output y, the values of the internal circuit wires and EK are used to produce the proof-of-correctness π. The proof π can be stored on the blockchain and verified by multiple parties without requiring the prover to separately interact with each of these entities.

All the bitcoin nodes can validate the payment transaction using the public verification key VK and the proof π, thus validating the contract.

Smart Contracts and Circuit Representation

Although domain-specific languages (DSL) are required to implement a smart contract, e.g., Actulus Modeling Language (AML), Digital Asset Modeling Language (DAML), Financial Products Markup Language (FpML), for the sake of simplicity of illustration we describe herein the use of a more generic language able to provide a higher range of types, operators and constructs such as the High Level Language (HLL), C. The invention can be arranged, however, to convert different DSL languages to C (or another HLL) using dedicated tools.

In the example used herein, the interpreter processes source code written in C. The invention could be adapted to work with other High Level Languages (which may also be referred to as "general-purpose languages" (GPLs). Examples of general-purpose programming languages include Ada, ALGOL, Assembly language, BASIC, Boo, C, C++, C#, Clojure, COBOL, Crystal, D, Dart, Elixir, Erlang, F#, Fortran, Go, Harbour, Haskell, Idris, Java, JavaScript, Julia, Lisp, Lua, Modula-2, NPL, Oberon, Objective-C, Pascal, Perl, PUP, Pike, PL/I, Python, Ring, RPG, Ruby, Rust, Scala, Simula, Swift, and Tcl.

Figure 2:
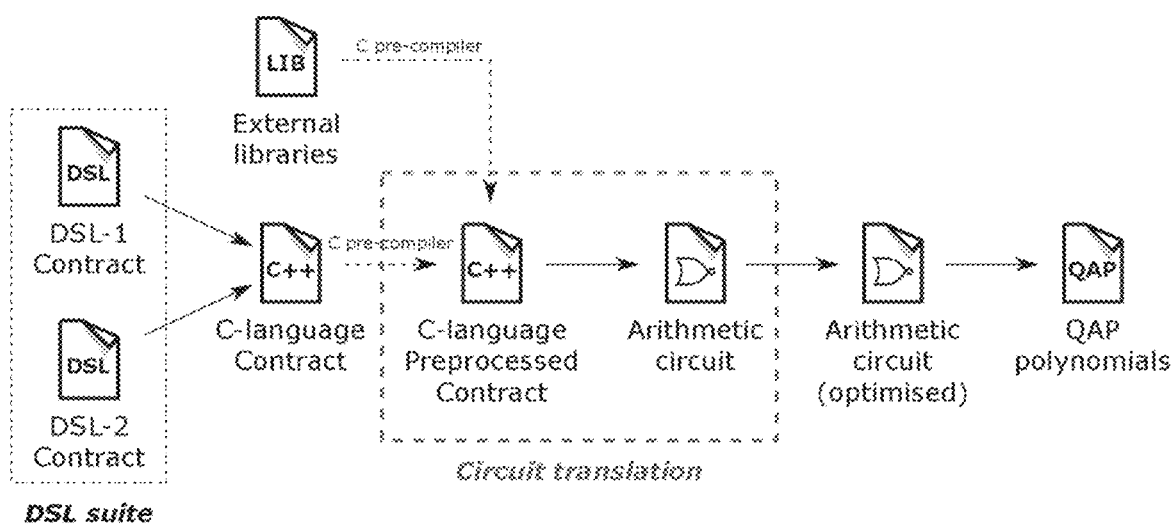
FIG. 2 shows the translation process from DSL contracts to Quadratic Arithmetic Programs (QAPs) in accordance with an embodiment of the invention.

A comprehensive pipeline for the translation of a high-level language to a logic circuit is shown in FIG. 2. In accordance with the present invention we focus on the module highlighted in the dotted line box in FIG. 2.

The high-level C program containing the contract and the required external libraries are linked together to make the stand-alone pre-processed contract. In this stage, the C pre-compiler is responsible for checking that all the required resources are available. Pre-processor directives are also evaluated.

Constant expressions are evaluated and all symbols are registered. The outcome is a set of expressions of C-like operators, such as addition (+), multiplication (*), comparison (<), equality (==), conditional statements (?, :) and logic operators (and, or, not, xor). We require the main function to have a predefined name and format. The arithmetic circuit (see FIG. 3) is built by representing symbols with n-bit wires connected to elementary arithmetic gates, e.g. addition and multiplication.

The polynomials in the Quadratic Arithmetic Program (QAP) are defined in terms of their evaluations at the roots of the arithmetic circuit as introduced in Gennaro, R., et al (2013) *Quadratic Span Programs and Succinct NIZKs Without PCPs.*

Figure 3:
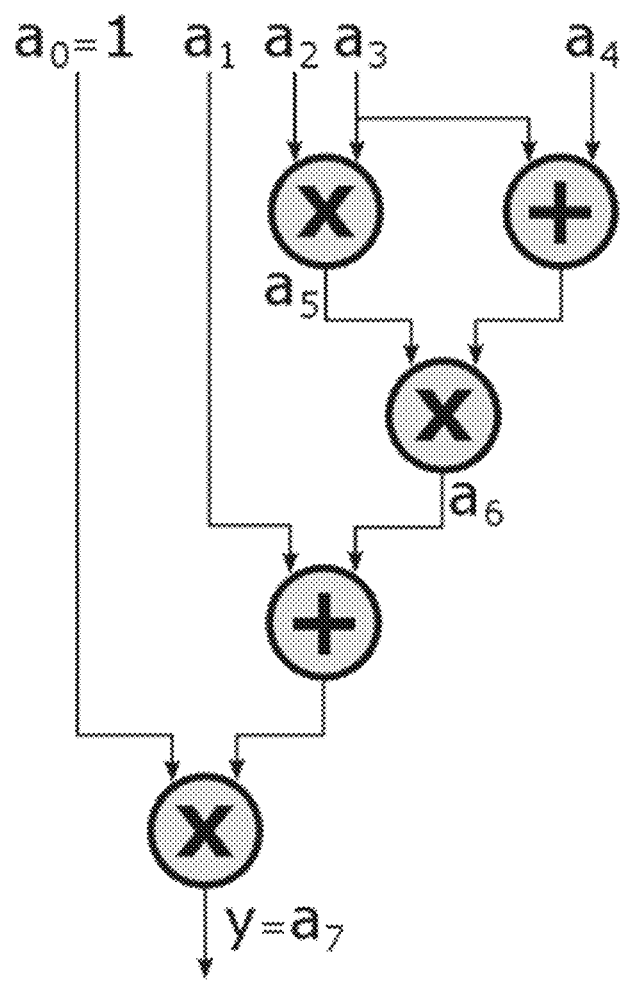
FIG. 3 shows an example of an arithmetic circuit in accordance with an embodiment of the invention.

FIG. 3 shows an example of an arithmetic circuit. Each wire comes from, and all operations are performed over, a field F. This circuit computes $y=x_1+x_2 \cdot x_3 \cdot (x_3+x_4)$. Since the final output of the circuit is a sum, an additional multiplication gate (multiply by constant one) is required.

C-Language Interpreter

In accordance with one illustrative embodiment of the invention, we now describe an interpreter able to recognize a subset of instructions defined for the C programming language, including: pre-processor directives, conditionals, arithmetic and bitwise Boolean operators, global functions. Support for arrays and structs can be also provided with no extra logic, as readily understood by the skilled person.

The interpreter enhances expression into the arithmetic gate language using multiplications, additions and specific building blocks presented in the section below entitled "Generation of arithmetic primitives." Each wire will have a specified bit-width. In case of 1-bit width, the wire represents a binary variable.

Arithmetic Enhancement of C-Like Programs for Implementation on a Blockchain

We now detail the process for the construction of an arithmetic circuit representing the functionality expressed by a C source code. At each stage of the process, an unexpected behaviour (e.g. missing symbol, wrong syntax or unknown operator) will result in the immediate termination of the program execution with an appropriate code error.

Pre-Processing

As shown in FIG. 2, a smart contract may consist of multiple files and libraries. The first step of the protocol involves the creation of a single source file containing the full set of instructions required to implement the contract. The individual sub-steps can be listed as follows:

All comments are removed.

Headers declarations are imported from the header files to the source files.

All source files are merged.

Pre-processor C directives and macros are solved or evaluated. They include #define directives and conditional #ifdef directives.

At the end of this step, the actual value of all pre-processor constants must be known. The value of the variables used in the source code must depend only on the values of the inputs of the contract. Moreover, the declaration of the entry point in the source code must have the following syntax:

void contract(inputType *in, outputType *out)

Types inputType and outputType are defined by the user. The following source code box shows a simple example of a smart contract containing a single sum operation between two unsigned integer inputs.

```
struct inputType { unsigned int i1; unsigned int i2; };
struct outputType { unsigned int o; };
void contract(struct inputType *in, struct outputType *out) {
    unsigned int val = in->i1 + in->i2;
    out->o = val;
}
```

The output can be represented by different types of variables, depending on the specific contract. In the case above, a single output is simply connected to the result of the arithmetic operation.

Integer and Real Numbers

In this illustrative embodiment, for the sake of simplicity, we assume that only operations between (signed or unsigned) integers are available. If this assumption is removed, the circuit building blocks (see Section "Generation of the arithmetic primitives") must be extended. Therefore, operations between real numbers must be converted into operations between integers. Let us consider the following portion of a contract:

"Check if the average salary of the employees is greater than $32.5K."

This statement requires a division (by N employees) in order to compute the average value. However, the statement can be converted into the following expression between integers:

$$\sum_{i=1}^{N} s_i > 32500 \cdot N$$

Where $s_i$ represents the salary of the i-th employee.

Creation of the Global Table of Symbols

In computer science, a Table of Symbols is a data structure used by a compiler/interpreter to associate each identifier (symbol) in the source code with information relating to its declaration. In this second step, the interpreter detects all the global symbols declared in the source file:

Functions

Structures (or classes)

Note: The use of classes (OOP languages such as C++) requires additional logic to check the scope of public, protected and private sections.

Constants (Global variables are also allowed but not recommended. The scope of contract( . . . ) function should be treated as an independent black box. Its behaviour should not depend on external variables).

For each of these symbols, a hierarchy of local symbols representing the internal declarations of their identifiers is built. At the end of this stage, each global symbol (name, type and value) in the table can be directly addressed for further processing.

Detection of the Entry Point of the Contract

One of the global symbols must be the entry point of the contract (Contract function in "pre-processing" Section). Name, number and type of its parameters are checked against the expected syntax. Additional logic may consist in checking that all inputs structures are used within the contract and all output structures are linked to some portions of the contract.

Line-by-Line Evaluation

Each code line is analysed independently. Local symbols, representing the internal declarations of identifiers, are included in the hierarchy of the global table of symbols. In more detail, this stage is responsible for the following tasks:

Decoding of types, including the declaration of structures and array, elementary types (Booleans, integers, etc.) and pointers.

Decoding of expressions, e.g. unary or binary operations, constants, identifiers, data structures and function calls.

Evaluation of expressions, i.e. evaluation of (numeric) expressions which do not depend on the input values.

Memory allocation, i.e. temporary storage allocation for the data structures required by the contract functionality.

This stage links all the statements of the arithmetic expression from a spatial (i.e. memory used) and temporal (i.e. operators precedence) point of view. Therefore, each output variable is expressed as combination of logic and arithmetic operations applied on the input variables.

Creation of the Explicit Arithmetic Expressions

Using the data structures defined in the "line-by-line" Section, a generic arithmetic/logic expression e is collapsed in order to be represented in explicit form according to the following syntax:

$OP_N(OP_{N-1}( \ldots (OP_1(OP_0)) \ldots ))$

According to this syntax, an arbitrary operator OP-+1 is applied to e after the operator $OP_i$.

For instance, given the following code:

```
void contract(struct inputType *in, struct outputType *out) {
    unsigned int val = in->i1 + in->i2 + in->i1 + in->i2;
    val = (val > 15) ? 44 + 6 : in->i1 * in->i2 * in->i2;
    out->o = val;
}
```

The explicit expression e can be represented as:

$out_0 = (?(<15 \text{ (ADD (ADD (ADD } in_0\ in_1)\ in_0)\ in_1))\ 50\ \text{(MUL (MUL } in_0\ in_1)\ in_1))$ As explained in Section "Generation of the arithmetic Primitives", the expression e is used to create the arithmetic primitives required to represent the contract functionality.

Generation of the Arithmetic Primitives

At this stage, the interpreter is ready to make a one-to-one mapping between the operations used to generate the expression e and the structures required to implement these functionalities on circuit.

Figure 4:
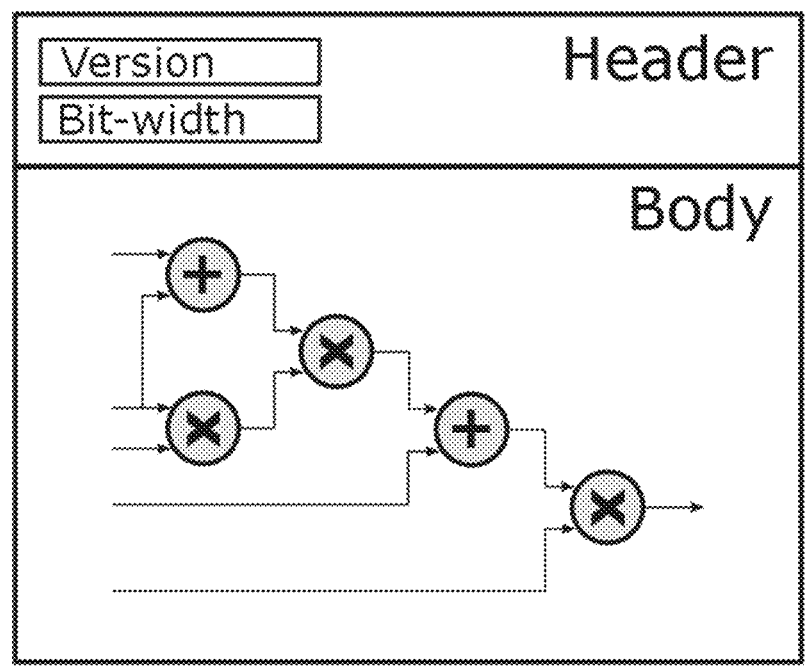
FIG. 4 shows a high-level description of a packet (header+body) containing a circuit representation in accordance with an embodiment of the invention.

An important parameter required to create the circuit is the bit-width $n_{bit}$, i.e. the number of bit used to represent a signed (or unsigned) integer number. Different computer architectures are characterised by different $n_{bit}$ values. If a client does not know a preferred bit-width value of a worker, its value will be arbitrarily chosen and specified in the header of the circuit along with additional information, as shown in FIG. 4. (Just as compilation is performed for a specific target architecture, knowing the bit-width value may result in a more efficient implementation and execution of the circuit).

The version field gives important information about the specific algorithm used to create a specific building block in the circuit. In our illustrative implementation we chose the two's complement binary representation of signed integers.

Addition and Multiplication Operations

Addition and multiplication operations are mapped one-to-one into addition and multiplication gates in the circuit. Given two n-bit wire inputs, an addition wire output requires n+1 bit and a multiplication wire output requires 2n bit. For instance, a multiplication between two $n_{bit}$ wires a and b can be represented as:

MUL [$id_a$ $id_b$] TO [$id_c$]

(Every arithmetic or Boolean wire x in the circuit can be univocally identified by a value $id_x$. As for binary variables, we start to count from value zero). The result c will be automatically represented on $2n_{bit}$ bit.

Boolean Operations

The full set of Boolean gates can be computed using arithmetic gates. Given two Boolean values a and b, the following equivalences are valid:

AND(a, b)=ab
NAND(a, b)=1−ab
OR(a, b)=1−(1−a)(1−b)
NOR(a, b)=(1−a)(1−b)
XOR(a, b)=(1−a)b+(1−b)a

Beside the XOR operator, each Boolean gate requires only one multiplication. All the arithmetic operations are perform on 1-bit width wires.

Bitwise Boolean operations on n-bit width inputs require n 1-bit multiplications (for AND) or additions (for OR). Starting from the least significative output bit, each element is then multiplied by two and added to the next element to build the resulting n-bit integer value (see Section "Wire Compression").

Wire Expansion

Wire expansion is usually used to translate an arithmetic wire a to an $n_a$-bit output wire, where $n_a$ is the base-2 logarithm of the maximum value which can be expressed by a. For instance, let us consider the following portion of a contract:

"Check if variable <a> is even."

Figure 5:
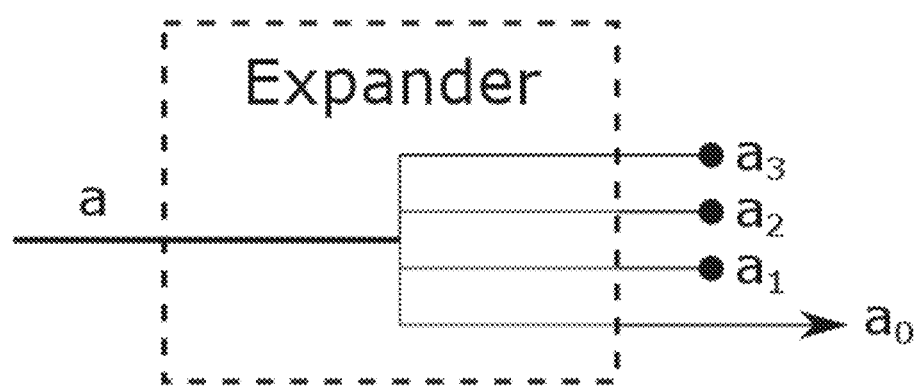
FIG. 5 shows an implementation of a 4-bit wire expander representing the statement "Check if variable <a> is even", as per the example described below.

If $n_a=4$, this statement is implemented using the wire expansion as shown in FIG. 5. Assuming that $a_0$ represents the least significative bit of a, the output of the statement is equal to $a_0$ itself. This circuit building block can be expressed as:

EXPAND [$id_a$] TO [$id_{a3}$ $id_{a2}$ $id_{a1}$ $id_{a0}$]

Taking a closer look at the circuit, it is clear that only one bit of a is required for further processing, while the remaining 1-bit wires can be removed. The interpreter may generate only the individual 1-bit wires used in the rest of the contract. FIG. 5 shows an implementation of a 4-bit wire expander representing the statement "Check if variable <a> is even."

The interpreter applies a specific syntax for the optimised wire expander:

EXPAND [$id_a$] TO [0->$id_{a0}$]

That is, only the least significative 1-bit wire (i.e. identifier number zero) is taken, and identifier $id_{a0}$ is assigned to it. The greater $n_a$, the more effective the optimisation may be. (In this context, we define optimisation as the possibility to save space to store or transmit the low-level directives used to represent the arithmetic circuit).

Wire Compression

Wire compression is used to combine 1-bit wires a; back to an $n_a$-bit output wire:

$$a = \sum_{i=0}^{n_a-1} 2^i a_i$$

This building block consist of additions and multiplications by constants, therefore the size of the QAP polynomial is not affected (See Genaro R., et al (2013) *Quadratic Span Programs and Succinct NIZKs Without PCPs*). Assuming that $n_a=256$ and identifiers in the range [$id_{a0}$, $id_{a255}$] are consecutive, an optimised way to represent this building block is the following:

COMPRESS [$id_{a0}$: $id_{a255}$] TO [$id_a$]

The resulting wire a will be then identified by $id_a$.

Negate Operation

The negate operation is necessary to compare two variables, since their difference can be compared to the value zero. Negating an $n_{bit}$-bit wire can be implemented as multiplication by constant −1. This constant must be represented as:

$$-1_{n_{bit}} \triangleq \sum_{i=0}^{n_{bit}-1} 2^i$$

Equal TO Zero Operation

This building block for an $n_{bit}$-bit wire a can be implemented as follows:

Wire expansion on $n_{bit}$ bit $(a_0, \ldots, a_{nbit-1})$;
Negate each 1-bit wire $(a_i \rightarrow b_i)$;
Multiply the resulting $b_i$ wires: $c = \Pi_{i=0}^{n_{bit}-1} b_t$
Therefore, 1-bit variable c=1 if and only if a=0.

Compare to Zero Operation

A "greater than" operation can be transformed in a "lower than" operation using simple equation rules. In the two's complement representation, this operations corresponds to check if the difference between two signed integers is positive or negative (or equal to zero in the case of "lower or equal than" operation). The discriminant of the sign of the difference c=a−b is given by the most significative bit x in the binary representation: negative numbers are characterised by x=1, while positive numbers are characterised by x=0:

EXPAND [ide] TO [$n_{bit}$−1−>x]

Depending on the type of comparison (positive vs negative), the binary value x is required to be negated.

Conditional Statement

A conditional statement in a high-level language can be expressed in the following form:

IF $(S_c)$ $S_a$ ELSE $S_b$

Figure 6:
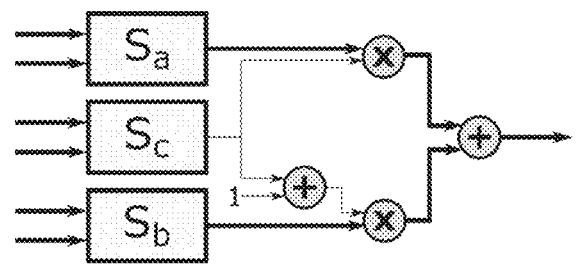
FIG. 6 shows a building block in accordance with an illustrative implementation of the invention, wherein the building block implements a conditional statement.

Since the statement $S_c$ depends on the input of the contract, both branches $S_a$ and $S_b$ must be implemented in the circuit. The logic flow is depicted in FIG. 6. Depending on the (binary) output of statement $S_c$, statement $S_a$ or statement $S_b$ will be executed. The binary operation x+1 is used to negate x.

Generation of Constants

Constant values do not depend on the input wires of the circuit. Using dedicated unary multiplication gates in the form mul-by-const-c, we provide the following additional circuitry to generate the constant values required by the contract:

The constant zero is computed by multiplying an input wire by zero. (The contract must have at least one input. Therefore, the input with identifier 1 (e.g. in$_1$ in FIG. 7) can be used to generate the constant zero).

The constant one is computed by adding one to the constant zero.

Any additional constant $c_i$ is computed by using mul-by-const-ci on the constant one.

Figure 7:
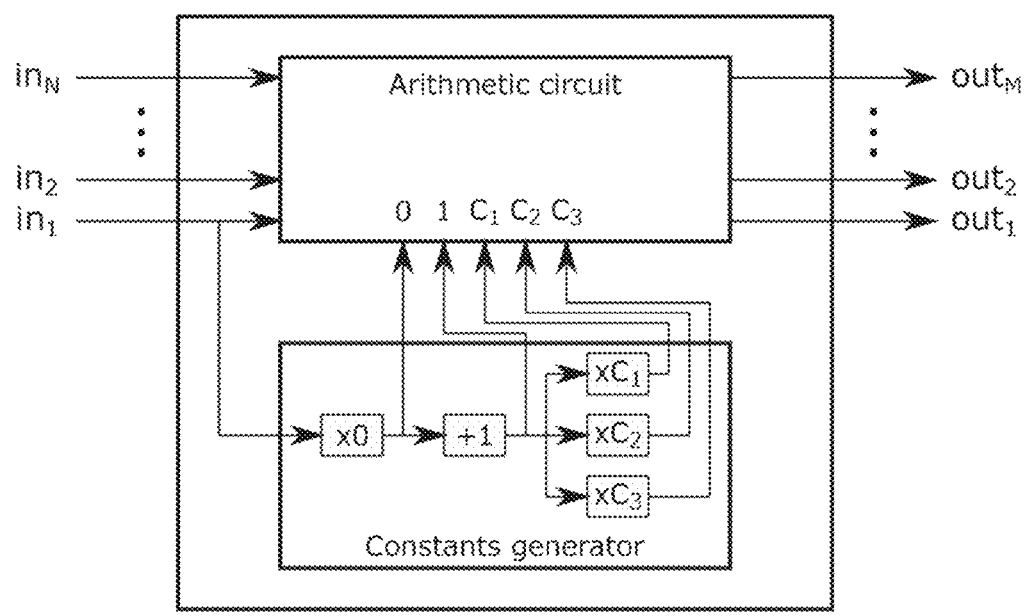
FIG. 7 illustrates how a constants generator module in accordance with an embodiment of the invention may be responsible for the creation of the constants used by the arithmetic circuit. In the example used, three constants ($C_1$, $C_2$ and $C_3$) plus default one (1) and zero (0) values are generated.

Since constants zero and one are always added to the circuit, the implementation of k arbitrary constants requires k+2 gates. This process is depicted in FIG. 7. A constants generator module provided in accordance with an embodiment of the invention is responsible for the creation of the constants used by the arithmetic circuit. In the example, three constants ($C_1$, $C_2$ and $C_3$) plus default one (1) and zero (0) values are generated.

Constants have a known bit-width as specified by the two's complement standard.

Figure 8:
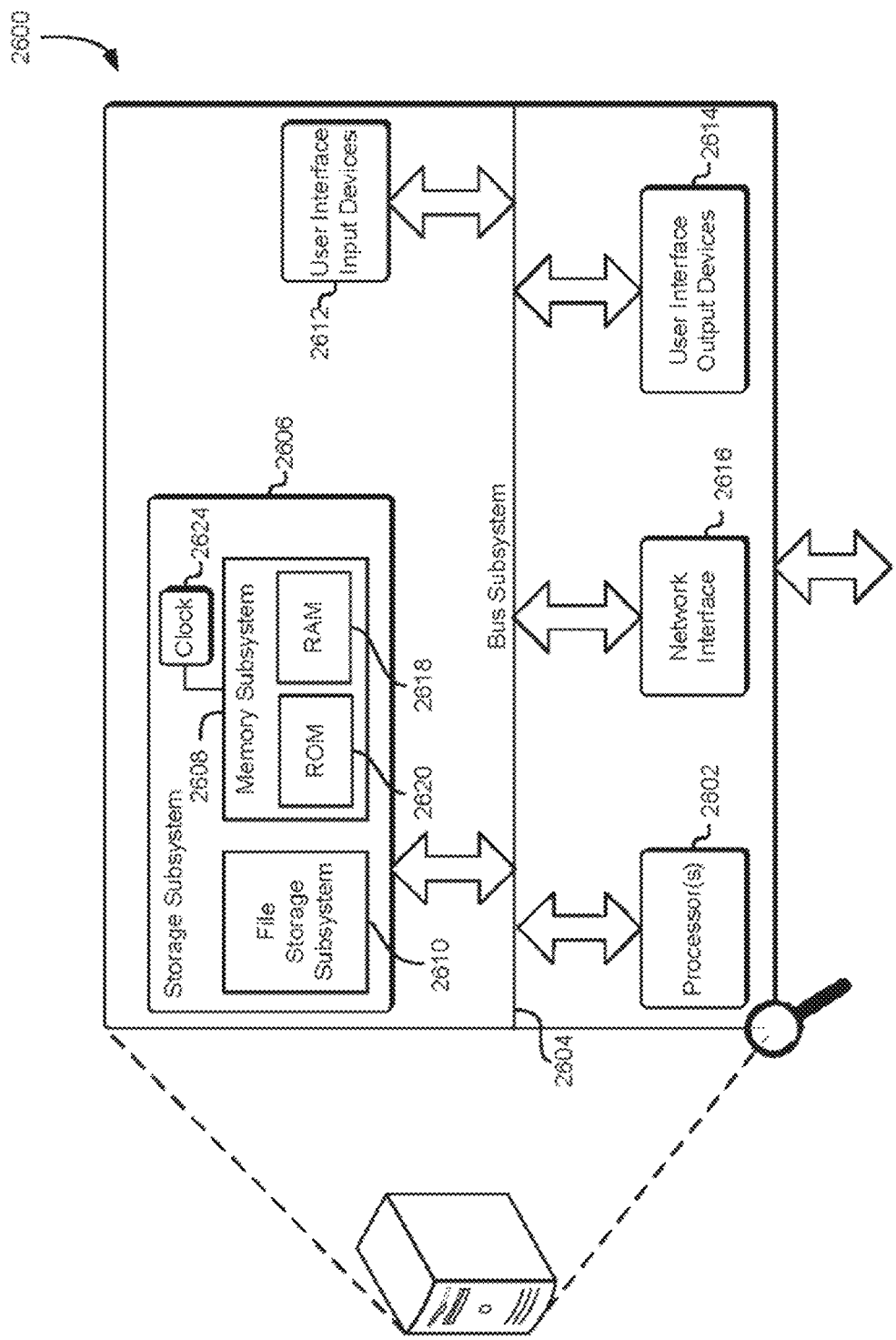
FIG. 8 is a schematic diagram illustrating a computing environment in which various embodiments can be implemented.

Turning now to FIG. 8, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 8, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 8 is intended only as a specific example for purposes of illustrating the preferred embodiment of the device. Many other configurations having more or fewer components than the system depicted in FIG. 8 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

All references, including publications, patent applications, and patents, cited herein are hereby incorporated by reference to the same extent as if each reference were individually and specifically indicated to be incorporated by reference and were set forth in its entirety herein. This includes UK patent application numbers: GB1719998.5, GB 1718505.9, GB 1720768.9.

What is claimed is:

1. A computer-implemented method comprising the steps: processing a portion of source code to generate an arithmetic circuit, wherein:
    the source code is written in a high level programming language, and
    the arithmetic circuit comprises:
        one or more arithmetic gates arranged to represent a portion of functionality expressed in the portion of source code, and
        n-bit wires connected to arithmetic gates;
    producing a proof of correctness using an output of one or more circuit wires of the arithmetic circuit and a public evaluation key (EK), wherein the proof of correctness is stored on a blockchain; and
    verifying, by one or more nodes of the blockchain, the proof of correctness stored on the blockchain by using a public verification key and the proof of correctness.

2. The computer-implemented method according to claim 1, wherein the public evaluation key (EK) is derived using a secret value.

3. The computer-implemented method according to claim 1, and further comprising the step of: using the arithmetic circuit to provide a hardware and/or a software circuit.

4. The computer-implemented method according to claim 1, wherein: the arithmetic circuit is architecture independent.

5. The computer-implemented method according to claim 1, wherein the method further comprises pre-processing of the source code to determine one or more constants, the pre-processing comprising one or more of the following steps:
    removing comments;
    importing header declarations from header files of two or more source files;
    merging the two or more source files; and
    solving or evaluating directives and macros.

6. The computer-implemented method according to claim 1, wherein the method further comprises the step of detecting all global variables declared in the source code, wherein a global variable relates to a function, a structure or class, a constant and/or an entry point for execution.

7. The computer-implemented method according to claim 1, wherein the method further comprises the step of: generating a table of symbols to associate each symbol provided in the source code with declaration information provided in the source code, the symbols in the table being global and or local symbols.

8. The computer-implemented method according to claim 1, wherein the method further comprises the step of performing a line-by-line evaluation of the source code that results in an arithmetic and/or a logic expression that expresses one or more output variables as a combination of an arithmetic and/or a logic operation applied on one or more input variables.

9. The computer-implemented method according to claim 8, wherein performing the line-by-line evaluation comprises the sub-steps of:
    decoding of types;
    decoding of expressions;
    evaluation of expressions; and/or
    allocation of memory for data structures required by the portion of functionality.

10. The computer-implemented method according to claim 8, and further comprising the step of mapping the arithmetic and/or logic operation of the expression to arithmetic gates.

11. The computer-implemented method according to claim 10, wherein mapping the arithmetic and/or logic operation comprises the sub-step of performing a wire expansion; and/or performing a wire compression.

12. The computer-implemented method according to claim 1, and further comprising the step of: using the arithmetic circuit to generate a quadratic program comprising a set of polynomials that provide a description of the circuit.

13. The computer-implemented method according to claim 12, and further comprising the step of: providing the quadratic program to an entity for execution of the quadratic program using one or more inputs.

14. A computer-implemented system arranged to perform the steps of claim 1, wherein the system comprises an interpreter stored in a memory arranged to perform the processing of the source code.

15. The computer-implemented method according to claim 1, wherein the public verification key is derived using a secret value.

* * * * *